US011061120B2

(12) United States Patent
Castorena Martinez et al.

(10) Patent No.: US 11,061,120 B2
(45) Date of Patent: Jul. 13, 2021

(54) SENSOR CALIBRATION (71) Applicant: Ford Global Technologies, LLC, Dearborn, MI (US)

(72) Inventors: Juan Enrique Castorena Martinez, Southfield, MI (US); Gintaras Vincent Puskorius, Novi, MI (US); Gaurav Pandey, Foster City, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 686 days.

(21) Appl. No.: 15/960,902

(22) Filed: Apr. 24, 2018

(65) Prior Publication Data

US 2019/0324129 A1 Oct. 24, 2019

(51) Int. Cl.
*G01S 7/497* (2006.01)
*G01C 3/08* (2006.01)
*G01S 17/931* (2020.01)

(52) U.S. Cl.
CPC .............. *G01S 7/497* (2013.01); *G01C 3/08* (2013.01); *G01S 17/931* (2020.01)

(58) Field of Classification Search
CPC ........ G01S 7/497; G01S 17/86; G01S 17/931; G01C 3/08; G01C 11/06
USPC ........................................ 356/4.02
See application file for complete search history.

(56) References Cited

U.S. PATENT DOCUMENTS

| | | | |
|---|---|---|---|
| 9,429,650 B2 | 8/2016 | Zeng et al. | |
| 9,530,062 B2 | 12/2016 | Nguyen et al. | |
| 9,805,255 B2 | 10/2017 | Yang et al. | |
| 2010/0157280 A1 | 6/2010 | Kusevic et al. | |
| 2010/0235129 A1 | 9/2010 | Sharma et al. | |
| 2017/0124781 A1 | 5/2017 | Douillard et al. | |
| 2017/0200273 A1 | 7/2017 | Kamilov et al. | |
| 2017/0323459 A1 | 11/2017 | Ermilios | |

FOREIGN PATENT DOCUMENTS

| | | |
|---|---|---|
| KR | 101040121 B1 | 6/2011 |
| WO | 2016100814 A1 | 6/2016 |

OTHER PUBLICATIONS

Mirzaei, et. al., "3D LIDAR-Camera Intrinsic and Extrinsic Calibration: Identifiability and Analytical Least-Squares-Based Initialization", The International Journal of Robotics Research, vol. 31, Issue 4 (2012), (pp. 452-467), downloaded from the Internet URL: http:/ijr.sagepub.com at Serials Records, University of Minnesota Libraries on Sep. 4, 2012 (16 pages).

Schneider, et al., "RegNet Multimodal Sensor Registration Using Deep Neural Networks", downloaded from the Internet URL: https://arxiv.org/pdf/1707.03167, Jul. 11, 2017 (8 pages).

(Continued)

*Primary Examiner* — Daniel L Murphy (74) *Attorney, Agent, or Firm* — Frank A. MacKenzie; Bejin Bieneman PLC (57) ABSTRACT

A system and methods are described for calibrating one sensor with respect to another. A method includes: determining a depth-motion vector using a first sensor; determining an optical-motion vector using a second sensor; and calibrating the first sensor with respect to the second sensor by minimizing a cost function that evaluates a distance between the depth-motion and optical-motion vectors.

20 Claims, 5 Drawing Sheets

(56) References Cited

OTHER PUBLICATIONS

Giering, et. al., "Multi-modal Sensor Registration for Vehicle Perception via Deep Neural Networks", United Technologies Research Center, E. Hartford, CT, downloaded from the Internet URL: https://arxiv.org/pdf/1412.7006, Jul. 8, 2015 (6 pages).
Quoc F. Le, et. al., "Joint Calibration of Multiple Sensors", The 2009 IEEE/RSJ International Conference on Intelligent Robots and Systems, Oct. 11-15, 2009, St. Louis USA (pp. 3651-3658) (8 pages).
Levinson, et. al., "Automatic Online Calibration of Cameras and Lasers", Stanford Artificial Intelligence Laboratory (8 pages), 2013.
Pandey, et. al., "Automatic Extrinsic Calibration of Vision and Lidar by Maximizing Mutual Information", Journal of Field Robotics DOI 10.1002/rob.21542, (wileyonlinelibrary.com), 1-27(2014), (pp. 1-27) (27 pages).
Castorena, et. al., "Motion Guided LIDAR-camera Automatic Calibration and Accelerated Depth Super Resolution", IEEE Member, Robotics and AI Laboratory, Ford Motor Company, Dearborn, MI, Mar. 28, 2018 (12 pages).

FIG. 5  Roll Offset

FIG. 6  Pitch Offset

FIG. 7  Yaw Offset

FIG. 8  X-Axis Offset

FIG. 9  Y-Axis Offset

FIG. 10  Z-Axis Offset

SENSOR CALIBRATION

BACKGROUND

Two imaging devices may be calibrated to a stationary target, so that the devices may be used in concert to monitor a common environment. However, when the imaging devices are carried by a vehicle, repeated calibration to a stationary target may become time-consuming and burdensome to human users of the vehicle.

DETAILED DESCRIPTION

A depth-resolving system is described that includes a first sensor, a second sensor, and a computer that receives data from the first and second sensors. According to one illustrative example, a method of using the system comprises: determining a depth-motion vector using a first sensor; determining an optical-motion vector using a second sensor; and calibrating the first sensor with respect to the second sensor by minimizing a cost function that evaluates a distance between the depth-motion and optical-motion vectors.

According to the at least one example set forth above, the first sensor is a light detection and ranging (LIDAR) device, wherein the second sensor is a camera.

According to the at least one example set forth above, the optical-motion vector, received from the second sensor, is derived from a sequence of optical-data patches, and wherein the depth-motion vector, received from the first sensor, is derived from a corresponding sequence of depth-data patches.

According to the at least one example set forth above, the first and second sensors share overlapping fields of view (FOVs), wherein the optical-data patches and the depth-data patches are received concurrently at a time index (l) and each comprise a common virtual object (or portion thereof).

According to the at least one example set forth above, the first and second sensors are aligned physically to share a common field of view, wherein the calibrating further comprises determining a set of calibration parameters ($\hat{\theta}$) based on a calibration offset $C(\theta)$ of the first sensor relative to the second sensor.

According to the at least one example set forth above, the depth-motion vector comprises a magnitude and direction of a virtual object (or portion thereof) over a sequence of first patches of depth data ($X_{Depth}^l$), captured by the first sensor, relative to a magnitude and direction of the virtual object (or portion thereof) over a sequence of second patches of optical data ($X_{Optical}^l$), captured by the second sensor.

According to the at least one example set forth above, each of the second patches includes the virtual object (or portion thereof) received from a cluster of pixels of the second sensor, wherein the first patch includes the virtual object (or portion thereof) from a corresponding region of the first sensor.

According to the at least one example set forth above, the calibrating occurs when the object moves relative to the first and second sensors.

According to the at least one example set forth above, a sampling step size of the sequence is based on a length or width dimension of one of the first patches and the length or width dimension of an optical-data frame.

According to the at least one example set forth above, each of the depth-motion and optical-motion vectors comprise a horizontal component and a vertical component, relative to respective fields of view of the first and second sensors.

According to the at least one example set forth above, calibrating the first sensor comprises determining a set of calibration parameters ($\hat{\theta}$) that satisfy the cost function, wherein the cost function comprises:

$$\hat{\theta} = \underset{\theta \in \Theta}{\mathrm{argmin}} \sum_{l=1}^{L} \|\omega(X_{Optical}^l) - \omega(X_{depth}^l(\theta))\|_{l_2},$$

wherein $\omega(X_{Optical}^l)$ is the optical-motion vector, wherein $\omega(X_{depth}^l(\theta))$ is the depth-motion vector, wherein L defines a quantity of motion vectors, wherein $\Theta$ is a set of possible calibration parameters ($\theta$).

According to the at least one example set forth above, the set of calibration parameters ($\hat{\theta}$) comprises: an X-axis offset value, a Y-axis offset value, a Z-axis offset value, a roll value, a pitch value, and a yaw value.

According to the at least one example set forth above, the cost function is a convex cost function.

According to the at least one example set forth above, the method further may comprise: determining calibrated depth data by applying the set of calibration parameters ($\hat{\theta}$) to depth data received from the first sensor.

According to the at least one example set forth above, the method further may comprise: generating a super-resolution depth-map using the calibrated depth data and estimated depth values.

According to another illustrative example, a computer program product is described. The computer program product may be stored on a non-transitory computer-readable storage medium for calibrating a first sensor with respect to a second sensor, the product may comprise instructions executable by a processor, the instructions comprising, to: determine a depth-motion vector using a first sensor; determine an optical-motion vector using a second sensor; and calibrate the first sensor with respect to the second sensor by minimizing a cost function that evaluates a distance between the depth-motion and optical-motion vectors.

According to the at least one example set forth above, wherein to calibrate the first sensor further comprises, to: determine a set of calibration parameters ($\hat{\theta}$) that satisfy the cost function, wherein the cost function comprises:

$$\hat{\theta} = \underset{\theta \in \Theta}{\mathrm{argmin}} \sum_{l=1}^{L} \|\omega(X_{Optical}^l) - \omega(X_{depth}^l(\theta))\|_{l_2},$$

wherein $\omega(X_{Optical}^l)$ is the optical-motion vector, wherein $\omega(X_{depth}^l(\theta))$ is the depth-motion vector, wherein L defines a quantity of motion vectors, wherein $\Theta$ is a set of possible calibration parameters ($\theta$).

According to the at least one example set forth above, the instructions further comprise, to: determine calibrated depth data by applying the set of calibration parameters ($\hat{\theta}$) to depth data received from the first sensor; and generate a super-resolution depth-map using the calibrated depth data and estimated depth values.

According to another illustrative example, a system is described. The system may comprise: a first sensor; a second sensor; and a computer, comprising a processor and memory storing instructions executable by the processor, the instructions comprising, to: determine a depth-motion vector using the first sensor; determine an optical-motion vector using the second sensor; and calibrate the first sensor with respect to the second sensor by minimizing a cost function that evaluates a distance between the depth-motion and optical-motion vectors.

According to the at least one example set forth above, wherein to calibrate the first sensor further comprises, to: determine a set of calibration parameters ($\hat{\theta}$) that satisfy the cost function, wherein the cost function comprises:

$$\hat{\theta} = \underset{\theta \in \Theta}{\operatorname{argmin}} \sum_{l=1}^{L} \|\omega(X_{Optical}^l) - \omega(X_{depth}^l(\theta))\|_{l_2},$$

wherein $\omega(X_{optical}^l)$ is the optical-motion vector, wherein $\omega(X_{depth}^l(\theta))$ is the depth-motion vector, wherein L defines a quantity of motion vectors, wherein $\Theta$ is a set of possible calibration parameters ($\theta$).

According to the at least one example, a computer is disclosed that is programmed to execute any combination of the method examples set forth above.

According to the at least one example, a computer program product is disclosed that includes a computer readable medium storing instructions executable by a computer processor, wherein the instructions include any combination of the instruction or method examples set forth above.

Figure 1:
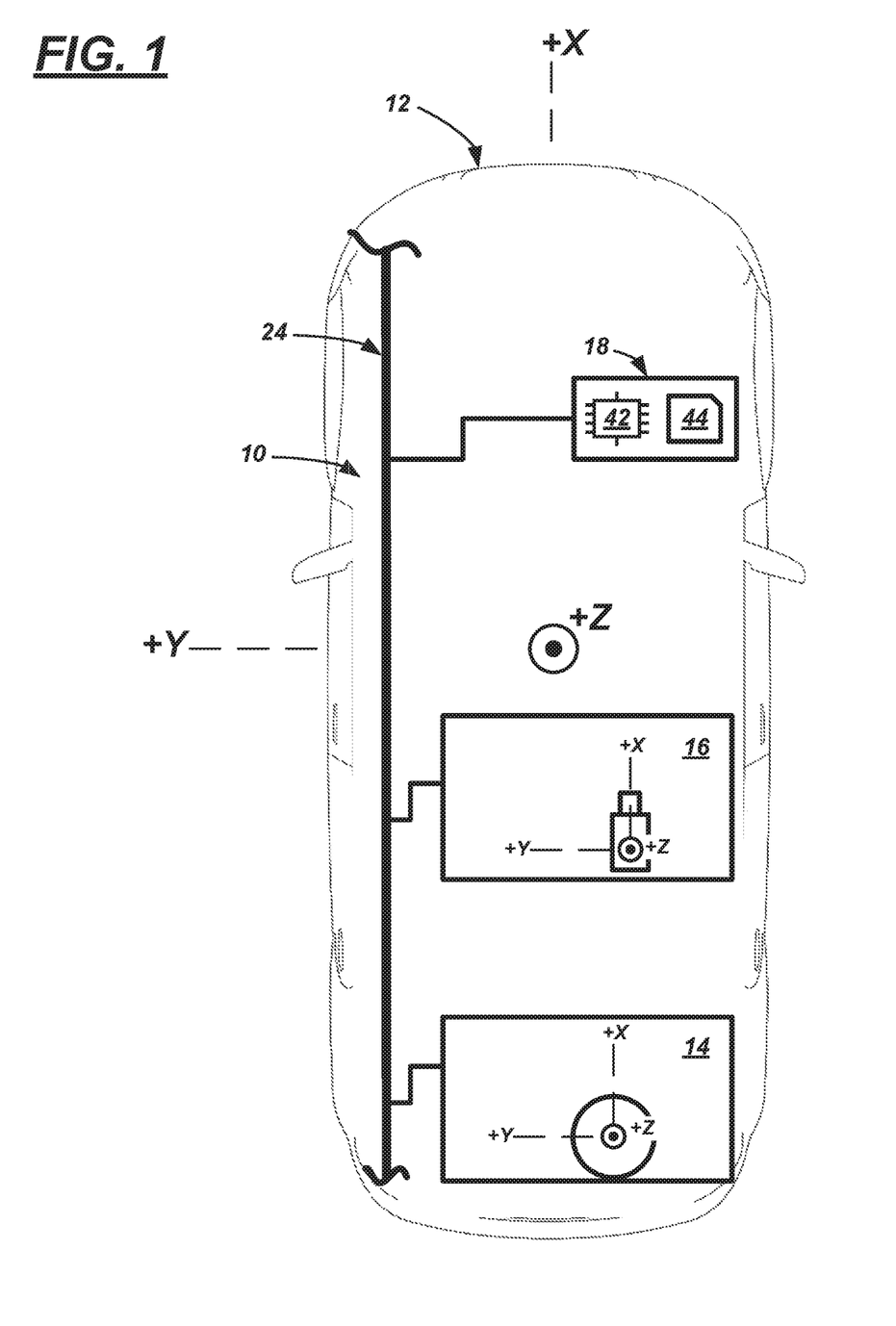
FIG. 1 is a schematic diagram illustrating a vehicle comprising a computer, a first sensor, and a second sensor.

Turning now to the figures, wherein like elements refer to similar or identical features or functions, a depth-resolving system 10 is illustrated. The system 10 shown in FIG. 1 is illustrated as part of a vehicle 12 which may use the system 10 for autonomous navigation or the like. It should be appreciated that a vehicle-implementation is merely one environment, and other environments are possible—including any suitable surveillance system, situational awareness system, safety system, or the like coupled to or carried by a mobile device, a portable device, or a static structure (e.g., static structures including but not limited to vehicle-related infrastructure or infrastructure unrelated to vehicles).

According to the illustrated example, the depth-resolving system 10 comprises a first sensor 14 (e.g., a light detection and ranging (LIDAR) device), a second sensor 16 (e.g., a camera), and a computer 18 which receives data from the first and second sensors 14, 16 and uses this data to operate vehicle 12 in an autonomous mode, as discussed below. According to at least one example, computer 18 uses relatively high-resolution optical data from the second sensor 16 to improve a resolution of the depth data received from the first sensor 14 (e.g., which typically has relatively lower resolution). For example, the computer 18 may generate a so-called super-resolution depth-map by calculating a reconstruction of the depth data. As used herein, depth data refers to data received from the first sensor 14 comprising three-dimensional information regarding the environment of the first sensor, and as used herein, optical data refers to data received from the second sensor 16 comprising two-dimensional information regarding the environment of the second sensor. Further, as used herein, a reconstruction of depth data refers to calculating depth data values to complement the raw depth data received at the computer 18, from the first sensor 14, and organizing the raw depth data, received from the first sensor 14, and the calculated depth data values into a data set comprising a depth-map which has a resolution that corresponds with a (higher) resolution of the second sensor 16.

In order to generate such a super-resolution depth-map, the depth data from the first sensor 14 may first need to be calibrated (e.g., also known as 'registered') with respect to the optical data received from the second sensor 16. In this context, calibration generally refers to matching of the optical data (e.g., pixel data comprising a virtual object) with the depth data (e.g., point cloud data corresponding to the same virtual object). While ideal calibration (e.g., perfect correspondence) is desirable, some calibration error between the first sensor 14 and the second sensor 16 is typical. This calibration error comprises translational and/or rotational deviations of first sensor 14 relative to second sensor 16. Such calibration error undesirably results in image-processing artifacts and decreases the quality of the reconstructed depth-map.

Figure 3:
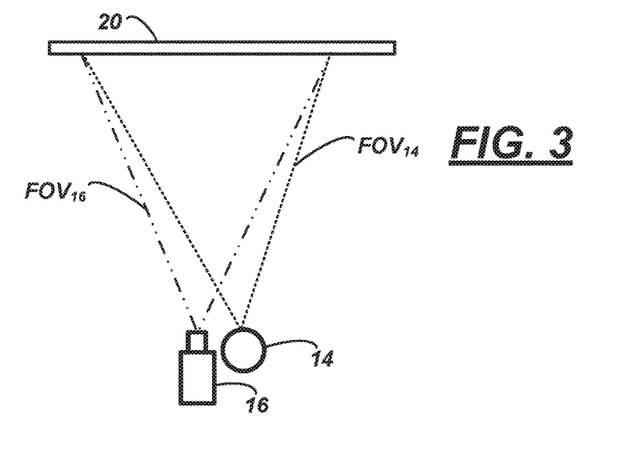
FIG. 3 is a schematic diagram illustrating an exemplary alignment of the first and second sensors.

To illustrate calibration, consider a static, laboratory environment. Here, e.g., two sensors can be mounted on a structure (e.g., an optical test bench; not shown) and positioned so that their respective fields of view overlap (as shown in FIG. 3)—e.g., making it possible for each sensor to image a common physical object 20 (e.g., the first sensor 14 may capture depth data (e.g., point cloud data values) comprising the physical object 20 while the second sensor 16 captures optical data (e.g., intensity and/or red-green-blue (RGB) values) of physical object 20). As used herein, a physical object is a three-dimensional object that exists in the real world, while a virtual object is a corresponding collection of data that represents the physical object 20 (e.g., which data may be storable in volatile or non-volatile computer memory). Using any suitable reference (e.g., a fixed calibration target or the like), an alignment and calibration of sensors 14, 16 may be performed; e.g., one of the sensors (16) may be aligned physically with the other (14) to have overlapping fields of view. In addition to physical alignment of the sensors 14, 16, a computer-implemented calculation may be executed that determines static calibration error (e.g., measurable error in spite of the physical alignment). In this fixed state and even in laboratory environments, impulses, floor and building vibrations, slight variations in temperature, etc. can cause calibration errors which necessitate recalibration. For example, one or both of the housings (not shown) of the two sensors may move with respect to the optical test bench, a detector or imaging plane (not shown) may move with respect to the sensor housing, an electrical response of the detector and/or other internal electronics may deviate based on pressure, temperature, or the like, just to name a few examples.

Continuing with the example above, when the same two sensors 14, 16 are aligned and mounted on vehicle 12, calibration errors may be larger in magnitude and may require multiple recalibrations per day—e.g., as the vehicle structure may bend and flex, as temperature and solar effects may vary widely throughout a given day causing uneven thermal expansion of the vehicle body or frame and/or sensor housing, as the vehicle 12 may experience numerous shocks and vibrations not typical of a laboratory environment, and the like. Further, in a vehicle environment, requiring manual recalibration of the sensors 14, 16 to a fixed target multiple times per day would result in user frustration. Consequently, the described-laboratory approach is less suitable for a vehicle environment.

In the present depth-resolving system 10, computer 18 is programmed to determine an optimal set of calibration parameters, to calibrate on-the-fly (e.g., in real- or near real-time), and to calibrate without the use of fixed or other specialized calibration targets. As will be explained in greater detail below, the computer 18 may determine at least one vector pair—e.g., a depth-motion vector (using depth data from sensor 14) and a corresponding optical-motion vector (using optical data from sensor 16). Further, computer 18 may determine an optimized set of calibration parameters ($\hat{\theta}$) by utilizing a cost function to evaluate a distance between the at least one vector pair. Then, the set of calibration parameters ($\hat{\theta}$) may be applied to subsequently-received depth data (hereafter, referred to as calibrated depth data). And as described above, using the optical data and the calibrated depth data, computer 18 may generate a high-quality super-resolution depth-map (e.g., thereby increasing the effective resolution of the first sensor 14). Further, the depth-map may have fewer artifacts as a result of the calibration process.

The current set of calibration parameters ($\hat{\theta}$) may be applied to the depth data until an updated set (e.g., the next set) of calibration parameters ($\hat{\theta}$) is calculated. Thereafter, the updated set of calibration parameters ($\hat{\theta}$) may be applied to the subsequently-received depth data, and a new super-resolution depth-map may be generated. The calibration process may be repeated as frequently as is suitable.

In the exemplary environment of vehicle 12, the super-resolution depth-map may be used to navigate autonomously vehicle 12. And in other environments, it may be used to improve situational awareness, improve detection of various objects which are challenging to detect using optical data alone, perform other tasks, etc.

A description of an example vehicle environment follows. Thereafter, examples of methods to calibrate sensor 14 with respect to sensor 16 will be described.

FIG. 1 illustrates vehicle 12 which comprises depth-resolving system 10. Vehicle 12 is shown as a passenger car; however, vehicle 12 could also be a truck, sports utility vehicle (SUV), recreational vehicle, bus, train car, aircraft, or the like that includes the depth-resolving system 10. According to one non-limiting example, vehicle 12 is an autonomous vehicle—i.e., it operates in a fully autonomous mode (e.g., a level 5), as defined by the Society of Automotive Engineers (SAE) (which has defined operation at levels 0-5). For example, at levels 0-2, a human driver monitors or controls the majority of the driving tasks, often with no help from the vehicle 12. For example, at level 0 ("no automation"), a human driver is responsible for all vehicle operations. At level 1 ("driver assistance"), the vehicle 12 sometimes assists with steering, acceleration, or braking, but the driver is still responsible for the vast majority of the vehicle control. At level 2 ("partial automation"), the vehicle 12 can control steering, acceleration, and braking under certain circumstances without human interaction. At levels 3-5, the vehicle 12 assumes more driving-related tasks. At level 3 ("conditional automation"), the vehicle 12 can handle steering, acceleration, and braking under certain circumstances, as well as monitoring of the driving environment. Level 3 may require the driver to intervene occasionally, however. At level 4 ("high automation"), the vehicle 12 can handle the same tasks as at level 3 but without relying on the driver to intervene in certain driving modes. At level 5 ("full automation"), the vehicle 12 can handle all tasks without any driver intervention.

In other examples, vehicle 12 is not a fully autonomous vehicle. For instance, vehicle 12 may operate in a partially autonomous or non-autonomous mode (e.g., one of levels 0-5) instead.

In FIG. 1, a non-limiting example of a Cartesian coordinate system is shown with respect to vehicle 12. In this example, an X-axis extends through a longitudinal length of the vehicle 12, a Y-axis extends transversely through the vehicle 12, and a Z-axis extends vertically through vehicle 12; in at least one example, an origin (not shown) may be located at a center-of-gravity (CG) of vehicle 12; however, this location is not required. At least first sensor 14 may have a corresponding X-, Y-, and Z-axis—e.g., having a respective origin within its housing or within the respective electronics thereof. Thus, according to one example, both (vehicle and first sensor) X-axes may be parallel, both (vehicle and first sensor) Y-axes may be parallel, and both (vehicle and first sensor) Z-axes may be parallel. Sensor 16 may be oriented similarly as sensor 14. Accordingly, as will be explained more below, to correct calibration errors of first sensor 14 relative to second sensor 16, calibration parameters ($\hat{\theta}$) may be quantified in terms of an X-axis offset (i.e., a translation or shift relative to the X-axis of first sensor 14), a Y-axis offset (i.e., a translation or shift relative to the Y-axis of first sensor 14), a Z-axis offset (i.e., a translation or shift relative to the Z-axis of first sensor 14), a roll offset (i.e., a rotation relative to the X-axis of first sensor 14), a pitch offset (i.e., a rotation relative to the Y-axis of first sensor 14), and/or a yaw offset (i.e., a rotation relative to the Z-axis of first sensor 14).

Turning now to the depth-resolving system shown in FIG. 1, system 10 may comprise first sensor 14, second sensor 16, and computer 18, as well as any suitable wired or wireless network connection 24 enabling communication between the devices 14, 16, 18 and any other electronic devices (not shown) onboard vehicle 12. In at least one example, the connection 24 includes one or more of a controller area network (CAN) bus, Ethernet, Local Interconnect Network (LIN), a fiber optic connection, or the like. Other examples also exist. For example, alternatively or in combination with e.g., a CAN bus, connection 24 could comprise one or more discrete wired or wireless connections.

First sensor 14 may be any suitable electronic device configured and/or programmed to determine a depth distance between a receiver (not shown) of the sensor 14 and a surface of a physical object in the scene (spaced therefrom). According to one non-limiting example, the first sensor 14 is a light detection and ranging (LIDAR) device. LIDAR devices are active sensing devices; i.e., they emit electro-magnetic radiation signals from an emitter at a time ($t_0$) and receive at a receiver a return or reflection of the emitted signal at a time ($t_1$)—thereby using the properties of light and time differential ($\Delta t$ or $t_1 - t_0$) to determine a distance between the LIDAR device and the object off which the signal reflected. The depth data received from LIDAR devices may be referred to as point cloud data (i.e., as used herein, point-cloud data comprises a set of data points (referred to herein as measured depth-elements) according to a predetermined coordinate system). In general, LIDAR devices are known to skilled artisans; hence, they will not be discussed in greater detail here. It should be appreciated that a LIDAR device is merely one example of a first sensor 14; other distance-measuring devices (e.g., radio detection and ranging (radar) devices, sonar devices, etc.) could be employed instead.

In LIDAR and other distance-measuring device implementations, the depth data of first sensor 14 may comprise range data, reflectance data, or a combination thereof. As used herein, range data includes a depth parameter (i.e., a distance value measured from sensor 14 to the physical object). And as used herein, reflectance data includes an intensity parameter (i.e., a measured value of return intensity—in the context of sensor 14 emitting a signal, the signal reflecting off a surface, and the reflected signal being received as a return at sensor 14). According to the state of the art, LIDAR devices may output only range data or a combination of reflectance and range data. The calibration process described in detail below operates independent of the type of depth data provided by first sensor 14; e.g., first sensor 14 can provide only range data or, alternatively, a combination of reflectance and range data.

Second sensor 16 may be any suitable electronic device configured and/or programmed to receive light energy and detect different bands of light within the electromagnetic spectrum. According to one non-limiting example, the second sensor 16 is a camera. Non-limiting examples of cameras include complementary metal oxide semiconductor (CMOS) devices, charge-coupled devices (CCDs), other passive sensing devices, active sensing devices, passive and active sensing devices (i.e., both), and the like. Cameras are known to skilled artisans; hence, they will not be discussed in greater detail here either.

Computer 18 comprises at least one processor 42 and memory 44 (e.g., a non-transitory, computer-readable storage medium). Processor 42 may be programmed to process and/or execute digital instructions to carry out at least some of the tasks described herein. Non-limiting examples of processor 42 include a microprocessor, a microcontroller or controller, an application specific integrated circuit (ASIC), a field-programmable gate array (FPGA), etc.—just to name a few. And a few non-limiting examples of digitally-stored instructions—storable in memory 44 and executable by processor 42—include, to: determine a depth-motion vector using first sensor 14; determine an optical-motion vector using second sensor 16; and calibrate the first sensor 14 with respect to the second sensor 14 by minimizing a cost function that evaluates a distance between the depth-motion and optical-motion vectors. Calibrating the first sensor 14 with respect to the second sensor 16 implies, in part, that depth data from the first sensor 14 is modified—e.g., using the set of calibration parameters ($\theta$). Additional and more specific examples of instructions which may be used instead of and/or in addition to these examples, as well as sequences of instructions, are described in the one or more processes below. In at least one example, computer 18 executes a computer program product stored on a non-transitory computer-readable storage medium (e.g., of memory 44). As used herein, a computer program product means a set of instructions (e.g., also called code).

Figure 2:
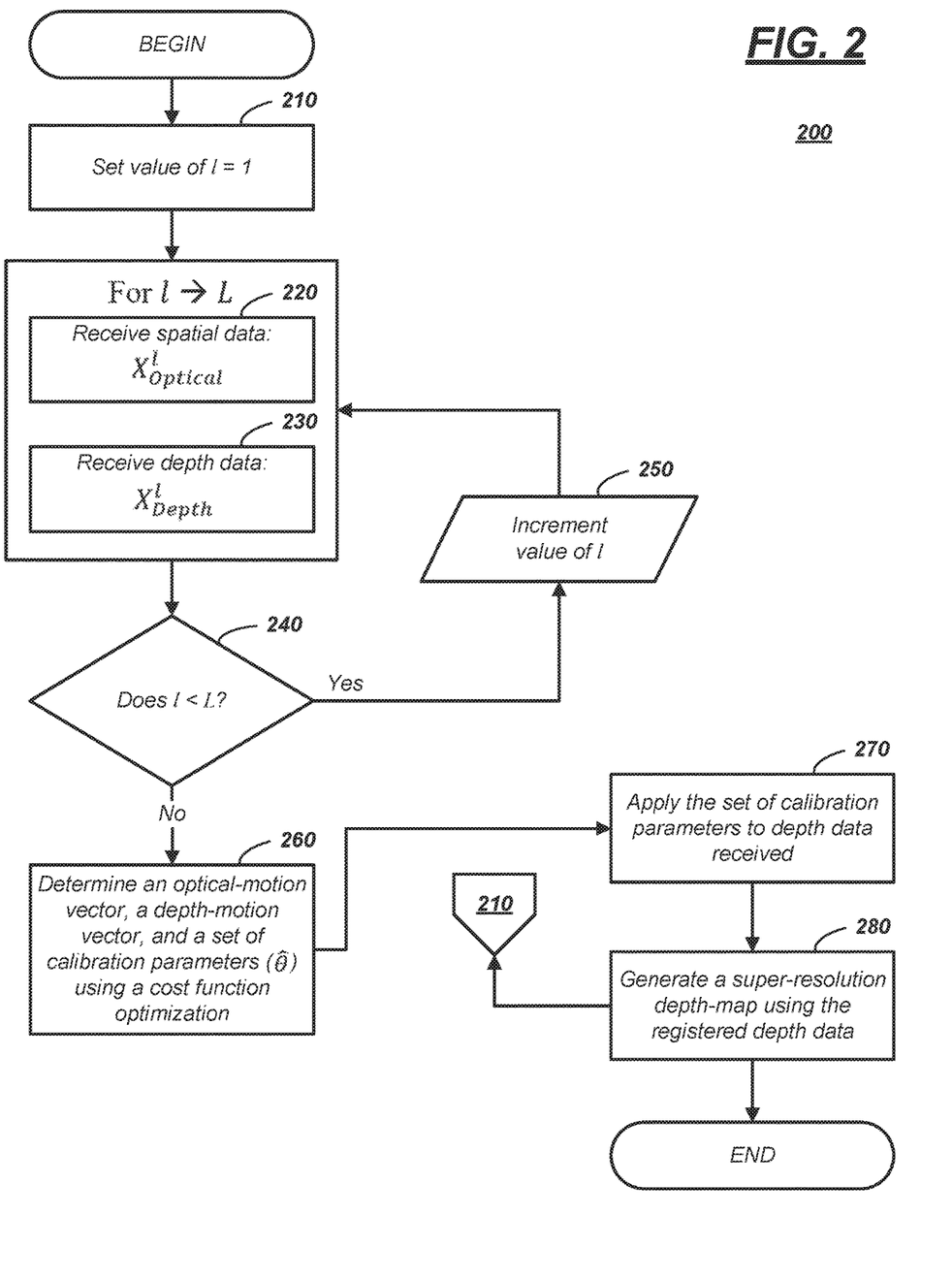
FIG. 2 is a flow diagram illustrating a process for calibrating the first sensor with respect to the second sensor.

Turning now to FIG. 2, a process 200 of calibrating one sensor with respect to another sensor is described. The process begins with block 210. In block 210, a timer circuit or the like is reset. The timer circuit may comprise one or more instructions stored in memory 44 and executable by processor 42. In other examples, it may comprise electronic circuitry, a chip, or the like. In the illustrated example, a value of a time index l is initialized (e.g., set equal to one (1)). Thereafter, the process proceeds to blocks 220 and 230.

Blocks 220 and 230 may occur concurrently. In block 220, at time index l=1, computer 18 may receive, from second sensor 16, optical data $X_{Optical}^{l}$ used to determine an optical-motion vector (as described more below). And in block 230, at time index l=1, computer 18 may receive, from first sensor 14, depth data $X_{Depth}^{l}$ used to determine a depth-motion vector (as also described more below). As used herein, a vector is a quantity having direction as well as magnitude.

According to one example, in block 220, instead of processing an entire frame of optical data $X_{Optical}^{l}$, computer 18 may extract an optical-data patch ($O_l$) from the received optical data $X_{Optical}^{l}$, in accordance with Equation (1). As used herein, a patch is a data subset of a frame (e.g., within a field of view such as $FOV_{16}$), wherein a frame comprises a larger set of data received from a respective sensor according to time index (l). In the context of sensor 16, a patch may be a small portion of a video frame.

$$X_{Optical}^{l} \leftarrow O_l \qquad \text{Equation (1)}$$

As will be described below, in order to calculate an optical-motion vector, computer 18 will receive multiple optical-data patches, as a change in the patch is required to calibrate sensor 14. According to one example, a location of each of the optical-data patches may be in a fixed position with respect to the field of view of sensor 16—i.e., while the location is fixed, the data that comprises the patches may change as the environment captured by sensor 16 changes.

According to one example, each optical-data patch ($O_l$) may comprise red/green/blue (RGB) data and/or intensity data received via adjacently-located pixels of second sensor 16 (e.g., a cluster of pixels). Further, according to one example, each optical-data patch may correspond to a region of a camera detector that includes approximately 30×30 pixels. In other examples, the size of the patches differs (e.g., corresponding to pixel regions of 20×20, 40×40, 50×50, and the like). The size of the patch may be predetermined and may be selected based on a trade-off between increasing computational speed (e.g., smaller patches) versus virtual object recognition (e.g., larger patches). For example, larger patches include more information, and computer 18 more readily may recognize virtual objects, whereas larger patches also require an increased use of volatile memory (e.g., part of memory 44) as well as increased computational resources of processor 42. Thus, in at least one example, while a sequence of frames could be used instead of a sequence of optical-data patches, this may increase costs (e.g., requiring additional processors 42), this may overdrive the operation of processor 42, and/or this may result in processing times which are impractical in some applications (e.g., such as autonomous driving applications).

Figure 4:
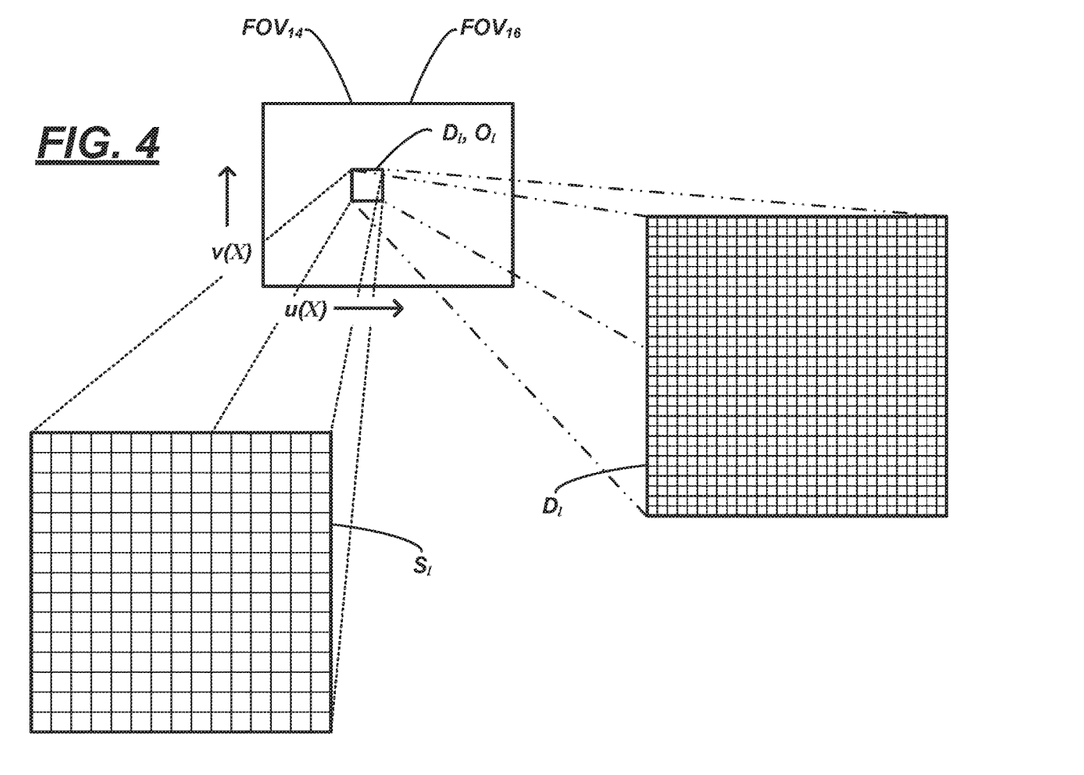
FIG. 4 is a schematic diagram depicting a first patch, within a field of view of the first sensor, calibrated to a second patch, within a field of view of the second sensor.

FIG. 3 illustrates a schematic top view of first sensor 14 and second sensor 16 sharing overlapping fields of view (e.g., $FOV_{14}$ of sensor 14 and $FOV_{16}$ of sensor 16). The overlapping fields of view represent that sensors 14, 16 are aligned (i.e., that first and second sensors 14, 16 are physically aligned). FIG. 4 illustrates a front perspective view of a depth-data patch ($D_l$) and optical-data patch ($O_l$) within the same overlapping fields of view $FOV_{14}$, $FOV_{16}$. Where fields of view $FOV_{14}$, $FOV_{16}$ overlay perfectly (e.g., ideal alignment) and where patches $O_1$, $D_1$ could overlay perfectly (e.g., ideal calibration), then no calibration error exists. However, as discussed above, in real-world scenarios, some calibration error is typical.

Block 230 may be similar to block 220, except that in block 230, computer 18 may extract a corresponding depth-data patch (e.g., $D_l$ from the received depth data $X_{Depth}^{l}$. See Equation (2). Depth-data patch $D_l$ may be received by sensor 14 while optical-data patch $O_l$ is received by sensor 16 (i.e., at time index l=1). Further, the location of each depth-data patch $D_l$ may be in a fixed position within the field of view $FOV_{14}$ (e.g., a predefined region thereof) that corresponds with the location of each optical-data patch $O_l$ in $FOV_{16}$. In the context of sensor 14, a patch may be a small portion of a frame of point cloud data.

$$X_{Depth}^l \leftarrow D_l \quad \text{Equation (2)}$$

Sampling step size (Δp) of optical-patch $O_l$ may be optimized to balance a trade-off between computational accuracy and processing speed (e.g., of processor 42) in accordance with Equation (3).

$$\text{Sampling step size } \Delta p = \frac{(\text{length or width of patch } X_{Depth}^l)}{k}, \quad \text{Equation (3)}$$

wherein k is a predetermined constant, wherein, when the patch $X_{Depth}^l$ is square, length and width dimensions are equal. (E.g.: $X_{Depth}^l$ may correspond with a 30×30 array of pixels (of the optical patch (e.g., an optical-data frame)); thus for instance, if k=4, then $$\Delta p = \frac{30}{4} \text{ or } \sim 8).$$

In block 240 which follows, computer 18 may determine whether time index l is equal to a predetermined value (L). Time index L may represent a quantity of motion vectors used in the cost function set forth below in Equation (6). The larger the value of L, the smoother the cost function output; however, the larger the value of L, also the larger the computational burden on processor 42.

In block 240, if computer 18 determines that l≥L, then process 200 proceeds to block 260, and if computer 18 determines that l<L, then process 200 proceeds to block 250. Process 200 may loop through block 250 at least twice before proceeding to block 260.

In block 250, the value of l is incremented or otherwise increased. For example, computer 18 may control the timer circuit to increase the value of 1. Thereafter, process 200 may repeat blocks 220 and 230 and re-evaluate block 240—repeating the loop back to block 250 and blocks 220, 230 until computer 18 determines that l≥L.

In block 260, computer 18 may determine an optical-motion vector, a depth-motion vector, and a set of calibration parameters ($\hat{\theta}$) using a cost function optimization. The optical-motion vector may be a vector expressed as a function of the optical data collected in block 220—and as expressed in Equation (4).

$$\omega(X_{Optical}^l) = [u(X_{Optical}^l), v(X_{Optical}^l)]^T, \quad \text{Equation (4)}$$

wherein $u(X_{Optical}^l)$ represents motion along a horizontal axis of field of view $FOV_{16}$, wherein $v(X_{Optical}^l)$ represents motion along a vertical axis thereof, wherein T represents a vector transpose.

FIG. 4 illustrates that relative movement of a virtual object within the 2D field of view $FOV_{16}$ may be comprised of two vector components which may be summed: $u(X_{Optical}^l)$ and $v(X_{Optical}^l)$. Optical-data vector $\omega(X_{Optical}^l)$, as well as its horizontal motion component $u(X_{Optical}^l)$ and its vertical motion component $v(X_{Optical}^l)$ each may be comprised of real number values, as expressed in Definitions (1), (2), and (3).

$$\omega(X): \mathbb{R}^{N \times 2} \to \mathbb{R}^{N \times 2} \quad \text{Definition (1)}$$

$$u(X): \mathbb{R}^N \to \mathbb{R}^N \quad \text{Definition (2)}$$

$$v(X): \mathbb{R}^N \to \mathbb{R}^N \quad \text{Definition (3)}$$

Thus, to calculate $\omega(X_{Optical}^l)$, computer 18 may track movement (e.g., also referred to as displacement) of a virtual object (or portion thereof) using the optical data $X_{Optical}^l$ repeatedly collected in block 220—e.g., where a physical object and sensor 16 are moving relative to one another. This may include use of any suitable image-processing or object recognition techniques including, but not limited to, edge detection, greyscale matching, gradient matching, and the like, just to name a few examples. Based on identification of a virtual object (or portion thereof) and based on the magnitude and direction of the movement of the virtual object (or portion thereof), computer 18 may calculate an optical-data vector $\omega(X_{Optical}^l)$, with respect to the field of view $FOV_{16}$.

The depth-motion vector of block 260 may be calculated similarly and in accordance with depth data $X_{Depth}^l$ collected repeatedly in block 230, except that the depth-motion vector may be expressed as a function not only of the depth data $X_{Depth}^l$, but also of the calibration parameters (θ), as shown in the nested function of Equation (5). Thus, Definitions (1), (2), and (3) apply to the depth-motion vector as well.

Recall that calibration parameters (θ) of sensor 14 with respect to sensor 16 may include variables in up to six degrees of freedom (6 DOF). Accordingly, parameters (θ) represents a set of values: an X-axis translation value, a Y-axis translation value, a Z-axis translation value, a roll value, a pitch value, and a yaw value.

$$\omega(X_{Depth}^l(\theta)) = [u(X_{Depth}^l(\theta)), v(X_{Depth}^l(\theta))]^T, \quad \text{Equation (5)}$$

wherein $u(X_{Depth}^l(\theta))$ represents motion along a horizontal axis of field of view $FOV_{14}$ with respect to calibration parameters (θ), wherein $v(X_{Depth}^l(\theta))$ represents motion along a vertical axis thereof with respect to calibration parameters θ, wherein T represents a vector transpose.

Like the optical-motion vector, motion may be detected within the depth data $X_{Depth}^l$ by measuring movement of virtual objects relative to sensor 14, except that here the depth data is sparse in comparison with the correspondingly available optical data (e.g., as depth data resolution typically is less than optical data resolution). For example, measured movement may include any suitable depth processing or object recognition techniques including, but not limited to, depth-discontinuity detection or the like. Based on the characteristics of the depth data, the roll, pitch, and yaw calibration parameters can be detected as well as calibration parameters with respect to X-, Y-, and Z-axis translations.

Next, computer 18 may use Equation (6) to calculate the set of calibration parameters ($\hat{\theta}$). Equation (6) is a cost function using an $l_2$ norm which may be optimized to determine calibration parameters ($\hat{\theta}$), based on a distance of the optical-motion vector $\omega(X_{Optical}^l)$ and the depth-motion vector $\omega(X_{Depth}^l(\theta))$ for a set of optical data $X_{Optical}^l$ and a corresponding set of depth data $X_{depth}^l(\theta)$, each evaluated from 1 to L. As used herein, optimization (or optimizing) refers to determining a set of calibration parameters ($\hat{\theta}$) based on a minima or convergence (e.g., using a convex cost function). In other examples, Equation (6) could utilize an $l_1$ norm or other distance metrics instead.

$$\hat{\theta} = \underset{\theta \in \Theta}{\operatorname{argmin}} \sum_{l=1}^{L} \|\omega(X_{Optical}^{l}) - \omega(X_{depth}^{l}(\theta))\|_{2},  \quad \text{Equation (6)}$$

wherein Θ represents a set of all possible calibration parameters (θ).

Thus, as the calibration parameters (θ) comprise 6 DOF (e.g., an X-axis translation value, a Y-axis translation value, a Z-axis translation value, a roll value, a pitch value, and a yaw value), there may be six calibration parameters ($\hat{\theta}$)—e.g., an X-axis offset, a Y-axis offset, a Z-axis offset, a roll offset, a pitch offset, and a yaw offset. Execution of the optimization of the cost function in Equation (6) by computer 18 iteratively brings depth-motion vector closer to the optical-motion vector (e.g., until convergence occurs). Following block 260, process 200 may proceed to block 270.

In block 270, the set of calibration parameters ($\hat{\theta}$) may be applied to the depth data received from sensor 14—e.g., so that depth data of sensor 14 more closely tracks the optical data of sensor 16. Further, the calibrated depth data is prepared for additional processing in block 280.

In block 280 which follows, computer 18 may generate a super-resolution depth-map using the calibrated depth data. Recall that the resolution of the depth data may be less than that of the optical data. As used herein, executing a super-resolution algorithm refers to improving the resolution of the calibrated depth data so that it equals or approaches the resolution of the optical data. According to one technique, computer 18 projects the depth measurements from the first sensor 14 by means of the calibration parameters into the pixel locations of the optical data (e.g., the camera image frame). Then, for those pixel measurements which do not have a corresponding depth-element, computer 18 executes a gradient based optimization to estimate depth values (e.g., another cost function may be executed as set forth in application Ser. No. 15/918,557, the entirety of which is incorporated herein by reference). These estimated depth values and the depth-elements measured by the first sensor 14 (i.e., the calibrated depth data) then can be combined to form a super-resolution depth-map having a resolution that matches that of the optical data. Thereafter, in vehicle environments, the super-resolution depth-map may be used by computer 18 or other computing devices to navigate vehicle 12 in an autonomous mode.

This implementation of block 280 is merely one example. Other techniques and algorithms for generating a super-resolution depth-map may be used instead and are known in the art. Following block 280, the process 200 may end. Alternatively, process 200 may loop back to block 210 and repeat itself in its entirety. Repetition of process 200 may occur according to a predetermined frequency or based on a threshold amount of calibration error. Further, the process 200—and repetitions thereof—may occur on-the-fly. For example, according to a vehicle implementation, this process can be carried out whenever the vehicle 12 is moving and/or whenever a portion of the scene is moving (i.e., relative to sensors 14, 16). Further, as explained above, the calibration algorithm described herein does not require the use of fixed or other specialized calibration targets, making it particularly suitable for vehicle environments.

Figure 5:
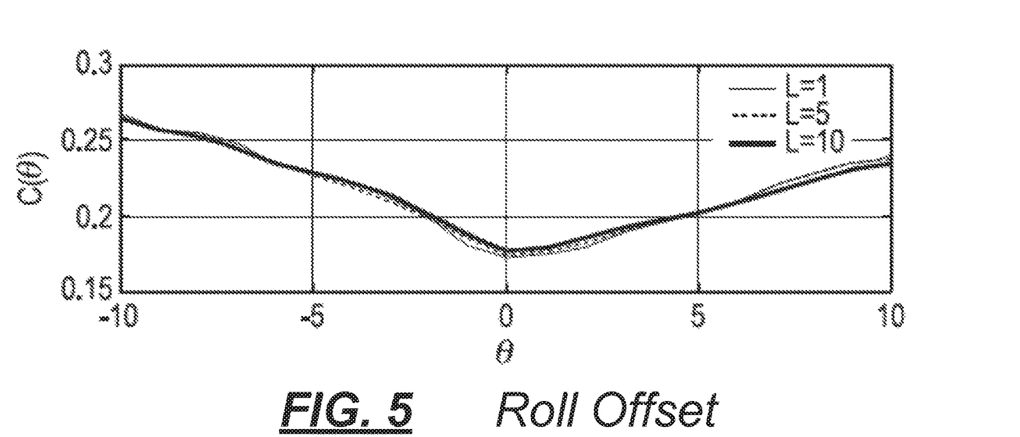
FIGS. 5-7 are graphical depictions of roll, pitch, and yaw offsets, respectively.
Figure 6:
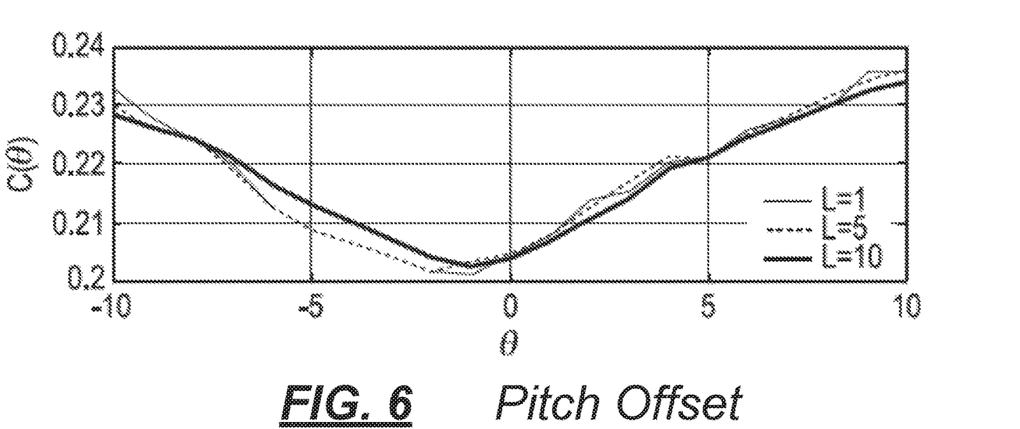
Figure 7:
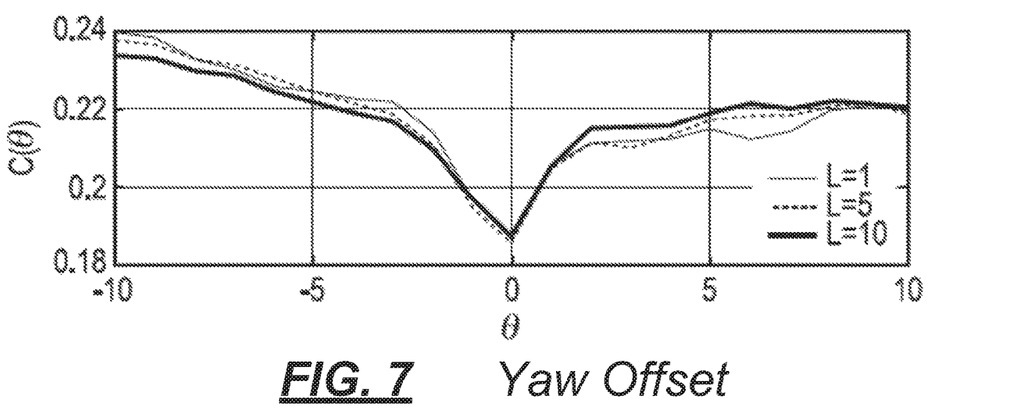
Figure 8:
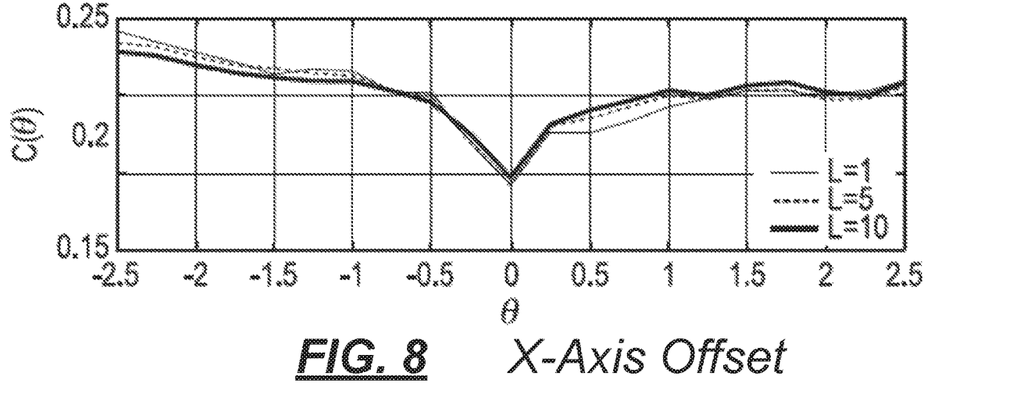
FIGS. 8-10 are graphical depictions of X-axis, Y-axis, and Z-axis translation offsets, respectively.
Figure 9:
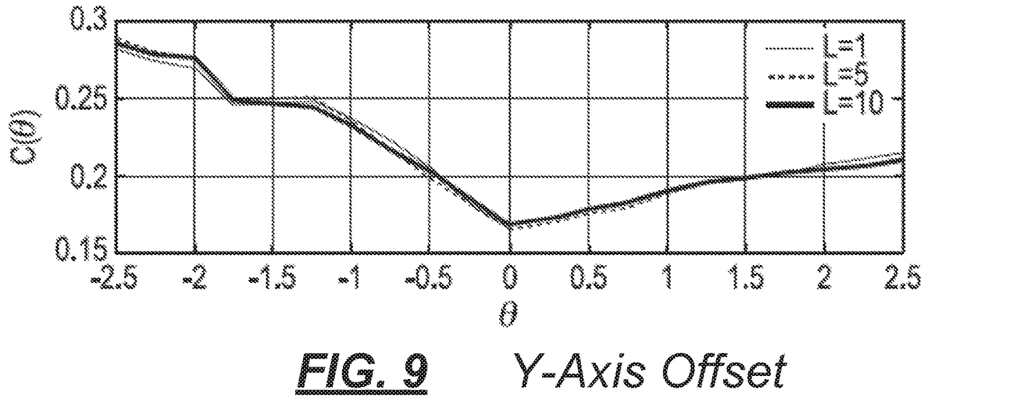
Figure 10:
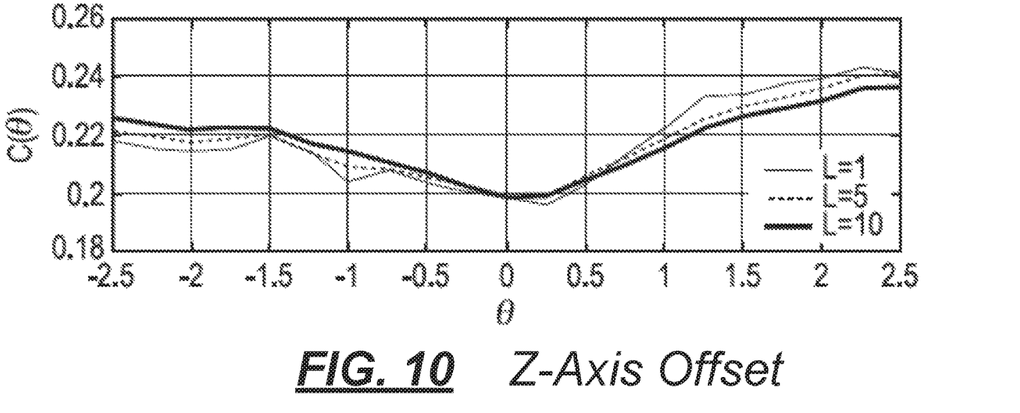

FIGS. 5-10 illustrate graphical depictions of test data; more particularly, the figures show examples of calibration offsets. For example, FIG. 5 illustrates roll offset; FIG. 6 illustrates pitch offset; FIG. 7 illustrates yaw offset; FIG. 8 illustrates X-axis translation offset; FIG. 9 illustrates Y-axis translation offset; and FIG. 10 illustrates Z-axis translation offset. In each instance, the cost function of Equation (6) (shown here as C(θ)) [dependent axis] is plotted against calibration offset θ [independent axis]. Further, each graphical depiction illustrates several curves—labeled L=1, L=5, and L=10. The depictions illustrate that for higher values of L, the curve smooths (e.g., converges). Of course, higher values of L also mean additional computations of for each calibration determination.

According to at least one example, sensors 14, 16 rotate relative to vehicle 12 (e.g., have respective fields of regard larger than their respective fields of view). In such circumstances, process 200 also may be carried out during any suitable overlap of the respective fields of view.

Thus, there has been described a depth-resolving system for a vehicle. The system may include a first sensor, a second sensor, and a computer. The computer is programmed to receive depth data from the first sensor, optical data from the second sensor, and then determine an optimal set of calibration parameters to calibrate the first sensor to the second sensor.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a computer-readable storage medium and/or a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random-access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. Memory 44 was provided as one example of such a computer-readable storage medium.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The processor is implemented via circuits, chips, or other electronic component and may include one or more microcontrollers, one or more field programmable gate arrays (FPGAs), one or more application specific circuits ASICs), one or more digital signal processors (DSPs), one or more custom integrated circuits, etc. The processor may be programmed to process the sensor data. Processing the data may include processing the video feed or other data stream captured by the sensors to determine the roadway lane of the host vehicle and the presence of any target vehicles. As described below, the processor instructs vehicle components to actuate in accordance with the sensor data. The processor may be incorporated into a controller, e.g., an autonomous mode controller.

The memory (or data storage device) is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory may store data collected from sensors.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A method, comprising:
determining a depth-motion vector using a first sensor by tracking movement of a first virtual object in a sequence of frames of depth sensor data;
determining an optical-motion vector using a second sensor by tracking movement of a second virtual object in a sequence of frames of optical sensor data; and
calibrating the first sensor with respect to the second sensor by minimizing a cost function that evaluates a distance between the depth-motion and optical-motion vectors wherein the first virtual object and the second virtual object both correspond to a physical object.

2. The method of claim 1, wherein the first sensor is a light detection and ranging (LIDAR) device, wherein the second sensor is a camera.

3. The method of claim 1, wherein the optical-motion vector, received from the second sensor, is derived from a sequence of optical-data patches, and wherein the depth-motion vector, received from the first sensor, is derived from a corresponding sequence of depth-data patches.

4. The method of claim 3, wherein the first and second sensors share overlapping fields of view (FOVs), wherein the optical-data patches and the depth-data patches are received concurrently at a time index (l) and each comprise a common virtual object (or portion thereof).

5. The method of claim 1, wherein the first and second sensors are aligned physically to share a common field of view, wherein the calibrating further comprises determining a set of calibration parameters ($\hat{\theta}$) based on a calibration offset $C(\theta)$ of the first sensor relative to the second sensor.

6. The method of claim 1, wherein the depth-motion vector comprises a magnitude and direction of a virtual object (or portion thereof) over a sequence of first patches of depth data ($X_{depth}^i$), captured by the first sensor, relative to a magnitude and direction of the virtual object (or portion thereof) over a sequence of second patches of optical data ($X_{Optical}^i$), captured by the second sensor.

7. The method of claim 6, wherein each of the second patches includes the virtual object (or portion thereof) received from a cluster of pixels of the second sensor, wherein the first patch includes the virtual object (or portion thereof) from a corresponding region of the first sensor.

8. The method of claim 6, wherein the calibrating occurs when the object moves relative to the first and second sensors.

9. The method of claim 6, wherein a sampling step size of the sequence is based on a length or width dimension of one of the first patches and the length or width dimension of an optical-data frame.

10. The method of claim 1, wherein each of the depth-motion and optical-motion vectors comprise a horizontal component and a vertical component, relative to respective fields of view of the first and second sensors.

11. The method of claim 1, wherein calibrating the first sensor comprises determining a set of calibration parameters ($\hat{\theta}$) that satisfy the cost function, wherein the cost function comprises:

$$\hat{\theta} = \underset{\theta \in \Theta}{\operatorname{argmin}} \sum_{l=1}^{L} \|\omega(X_{Optical}^l) - \omega(X_{depth}^l(\theta))\|_{l_2},$$

wherein $\omega(X_{Optical}^i)$ is the optical-motion vector, wherein $\omega(X_{depth}^i(\theta))$ is the depth-motion vector, wherein L defines a quantity of motion vectors, wherein $\Theta$ is a set of possible calibration parameters ($\hat{\theta}$).

12. The method of claim 11, wherein the set of calibration parameters ($\hat{\theta}$) comprises: an X-axis value, a Y-axis value, a Z-axis value, a roll value, a pitch value, and a yaw value.

13. The method of claim 11, wherein the cost function is a convex cost function.

14. The method of claim 11, further comprising: determining calibrated depth data by applying the set of calibration parameters ($\hat{\theta}$) to depth data received from the first sensor.

15. The method of claim 14, further comprising: generating a super-resolution depth-map using the calibrated depth data and estimated depth values.

16. A computer program product stored on a non-transitory computer-readable storage medium for calibrating a first sensor with respect to a second sensor, the product comprising instructions executable by a processor, the instructions comprising, to:
determine a depth-motion vector using a first sensor by tracking movement of a first virtual object in a sequence of frames of depth sensor data;
determine an optical-motion vector using a second sensor by tracking movement of a second virtual object in a sequence of frames of optical sensor data; and
calibrate the first sensor with respect to the second sensor by minimizing a cost function that evaluates a distance between the depth-motion and optical-motion vectors wherein the first virtual object and the second virtual object both correspond to a physical object.

17. The computer program product of claim 16, wherein to calibrate the first sensor further comprises, to: determine a set of calibration parameters ($\hat{\theta}$) that satisfy the cost function, wherein the cost function comprises:

$$\hat{\theta} = \operatorname*{argmin}_{\theta \in \Theta} \sum_{l=1}^{L} \|\omega(X_{Optical}^l) - \omega(X_{depth}^l(\theta))\|_{l_2},$$

wherein $\omega(X_{Optical}^i)$ is the optical-motion vector, wherein $\omega(X_{depth}^i(\theta))$ is the depth-motion vector, wherein L defines a quantity of motion vectors, wherein $\Theta$ is a set of possible calibration errors ($\hat{\theta}$).

18. The computer program product of claim 17, wherein the instructions further comprise, to: determine calibrated depth data by applying the set of calibration parameters ($\hat{\theta}$) to depth data received from the first sensor; and generate a super-resolution depth-map using the calibrated depth data and estimated depth values.

19. A system, comprising:
a first sensor;
a second sensor; and
a computer, comprising a processor and memory storing instructions executable by the processor, the instructions comprising, to:
determine a depth-motion vector using the first sensor by tracking movement of a first virtual object in a sequence of frames of depth sensor data;
determine an optical-motion vector using the second sensor by tracking movement of a second virtual object in a sequence of frames of optical sensor data; and
calibrate the first sensor with respect to the second sensor by minimizing a cost function that evaluates a distance between the depth-motion and optical-motion vectors wherein the first virtual object and the second virtual object both correspond to a physical object.

20. The system of claim 19, wherein to calibrate the first sensor further comprises, to: determine a set of calibration parameters ($\hat{\theta}$) that satisfy the cost function, wherein the cost function comprises:

$$\hat{\theta} = \operatorname*{argmin}_{\theta \in \Theta} \sum_{l=1}^{L} \|\omega(X_{Optical}^l) - \omega(X_{depth}^l(\theta))\|_{l_2},$$

wherein $\omega(X_{Optical}^i)$ is the optical-motion vector, wherein $\omega(X_{depth}^i(\theta))$ is the depth-motion vector, wherein L defines a quantity of motion vectors, wherein $\Theta$ is a set of possible calibration parameters ($\hat{\theta}$).

* * * * *